United States Statutory Invention Registration [19]

[11] Reg. Number: H432

Mariani et al. [43] Published: Feb. 2, 1988

[54] SLOT LINE TUNABLE BANDPASS FILTER

[75] Inventors: Elio A. Mariani, Hamilton Square; Richard A. Stern, Allenwood, both of N.J.

[73] Assignee: The United States of America as represented by the Secretary of the Army, Washington, D.C.

[21] Appl. No.: 763,161

[22] Filed: Aug. 7, 1985

[51] Int. Cl.[4] ..... H01P 1/203

[52] U.S. Cl. ..... 333/205; 333/235

[58] Field of Search ..... 333/205, 204, 219-221, 333/24.1, 161, 246, 235

[56] References Cited

U.S. PATENT DOCUMENTS

| | | | |
|---|---|---|---|
| 3,539,950 | 11/1970 | Freibergs | 333/161 |
| 3,602,845 | 8/1971 | Agrios et al. | 333/24.1 |
| 3,688,225 | 8/1972 | Cohn | 333/204 |
| 3,766,494 | 10/1973 | Anbe et al. | 333/205 X |
| 4,020,429 | 4/1977 | Bickley | 333/205 |
| 4,027,253 | 5/1977 | Chiron et al. | 333/238 X |
| 4,169,252 | 9/1979 | Muskiewicz | 333/205 |

OTHER PUBLICATIONS

IEEE Transactions on Microwave Theory and Techniques, vol. MTT-17, No. 12, Dec. 1969, "Slot Line Characteristics", Elio A. Mariani, et al., pp. 1091-1096.

IEEE Transactions on Microwave Theory and Techniques, vol. MTT-18, No. 12, Dec., 1970, "Slot-Line Filters and Couplers", Elio A. Mariani, et al., pp. 1089-1095.

Application of Slot Line to Miniature Ferrite Devices, May, 1969, discloses concept of slot line on a dielectric substrate.

*Primary Examiner*—Stephen C. Buczinski
*Assistant Examiner*—Linda J. Wallace
*Attorney, Agent, or Firm*—Sheldon Kanars; Jeremiah Murray; Robert A. Maikis

[57] ABSTRACT

A tunable bandpass filter comprising a pair of slot line resonant cavities formed in a metallic film covering the planar surface of a ferrite substrate. A magnetic biasing field of variable magnitude is generated and applied through the ferrite substrate transversely across the slot line resonant cavities. The magnetic field operates to change the electrical length of the resonant cavities due to the fact that the magnetic permeability of the ferrite material changes with the applied field.

11 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SLOT LINE TUNABLE BANDPASS FILTER

The invention described herein may be manufactured and used by or for the Government for governmental purposes without the payment of any royalties thereon or therefor.

BACKGROUND OF THE INVENTION

1. Field of the Invention

This invention relates generally to microwave and millimeter wave signal filters and more particularly to such filters which utilize slot transmission lines as the propagating medium.

2. Description of the Prior Art

Slot line filters and the characteristics of slot transmission lines are well known and described, for example, in: *IEEE Transactions On Microwave Theory And Techniques*, "Slot Line Characteristics", Elio A. Mariani, et al., Vol. MTT-17, No. 12, December, 1969, pp. 1091–1096; and *IEEE Transactions On Microwave Theory And Techniques*, "Slot-Line Filters And Couplers", Elio A. Mariani, et al., Vol. MTT-18, No. 12, December, 1970, pp. 1089–1095. As disclosed in those two articles, a slot transmission line comprises an elongated, relatively narrow slot formed in a metal coating applied to a dielectric substrate. This structure provides a transmission line for application to microwave integrated circuits. The slot line offers a unique combination of a planar type geometry and a TE dominant mode similar to the dominant mode of a rectangular waveguide. Furthermore, the slot line can be combined with microstrip circuitry utilizing a common dielectric substrate whereby two transmission lines are coupled through the dielectric medium.

Where a filter configuration is desired, the article entitled, "Slot Line Filter Couplers", proposes configuring a bandpass filter, for example, by a pair of quarter wave coupled resonant slots or a pair of end coupled resonant slots fabricated on a dielectric substrate. Coupling to and from the resonant slots can be achieved by either of two means: using a grounded center conductor of a semi-rigid coaxial cable traversing the slot and forming a magnetic coupling loop thereby or using a length of microstrip transmission line traversing the slot on the opposite side of the substrate.

Where a tunable filter is desired, the current state of the art proposes the use of the well known magnetically-tunable, yttrium-iron-garnat (YIG) filter; however, such structures result in relatively complex, costly coaxial circuit configurations which are non-planar.

Accordingly, it is an object of the present invention to provide an improvement in slot transmission line filters.

It is a further object of the invention to provide a tunable slot transmission line filter.

It is yet a further object of the invention to provide a tunable slot transmission line filter which provides relatively narrow-band frequency selectivity, i.e. pass-band, over a relatively broad operating band in the microwave and millimeter wave frequency range.

SUMMARY

Briefly, the foregoing and other objects are achieved by a pair of slot line resonant cavities formed in a metallic film covering a generally flat major face of a ferrite substrate. The two resonant cavities have a length of one half the guide wavelength and are end-coupled in a first embodiment and quarter-wavelength, side-coupled in a second embodiment. The mutual separation between the slots determines the coupling strength between the coupled slots and in turn determines the actual bandwidth of the filter. Frequency tunability is provided by the application of a varying biasing magnetic field through the ferrite substrate transversely to the longitudinal dimension of the slots, whose electrical lengths are effectively changed as a result of the change in permeability of the ferrite material as a function of the applied field. Microwave/millimeter wave energy is coupled to and from the filter by way of a magnetic coupling loop formed using either the center conductor of a coaxial transmission line shorted to the metallic film or by way of an open microstrip transmission line orthogonally located on the opposite side of the substrate.

DETAILED DESCRIPTION OF THE PREFERRED EMBODIMENT

Figure 1:
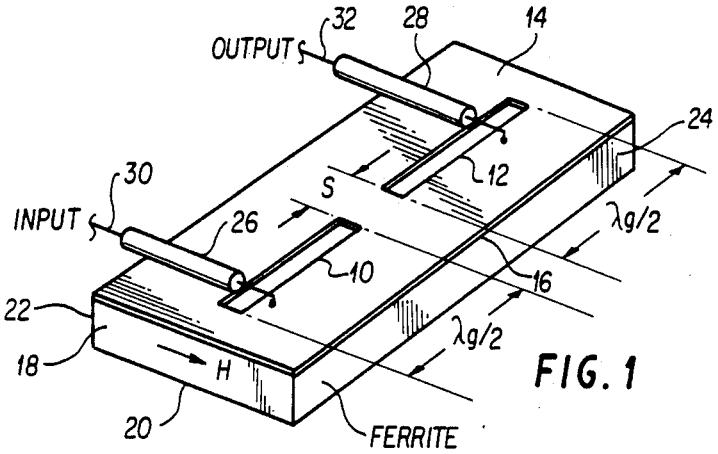
FIG. 1 is a perspective view generally illustrative of a first embodiment of the invention.

Whereas known slot line bandpass filters employ dielectric substrates of relatively high permittivity $\epsilon_r$, a typical example being magnesium titanate where $\epsilon_r$ is equal to 13, such devices provide a fixed frequency characteristic. The present invention, on the other hand, is directed to a variable slot line bandpass filter having a tunable frequency characteristic. This is achieved in a first embodiment, as shown in FIG. 1, by a pair of resonant cavities in the form of two equal length elongated rectangular slots 10 and 12 etched, for example, in a relatively thin metallic film 14 affixed to a substantially flat major i.e. relatively large upper face 16 of a substrate 18 comprised of ferrite material and having a generally rectangular cross section including a bottom major face 20 and a pair of opposing side faces 22 and 24. The metallic film 14 is preferably comprised of copper. In the configuration shown in FIG. 1, the two slots 10 and 12 have a relatively narrow width and a length of $\lambda_g/2$ where $\lambda_g$ represents the guide wavelength, the wavelength of the electromagnetic wave energy in the filter or wave guide.

The resonant cavities 10 and 12 of FIG. 1, moreover, are shown in an end-coupled configuration and having a mutual separation S which determines the coupling strength between the coupled cavities. This in turn determines the fractional bandwidth ($\Delta f/f_0$) of the filter, where $f_0$ is the center frequency of the pass band, and $\Delta F$ is the bandwidth of operation.

Input and output coupling of microwave/millimeter wave energy is provided by a pair of coaxial cable transmission lines 26 and 28, the center conductors 30 and 32 of which respectively traverse the resonant cavities 10 and 12 and which are soldered to the outer surface and effectively is shorted to the metallic film 14, thus forming a magnetic coupling loop.

The bandpass filter thus configured is made tunable to provide a relatively narrow band frequency selectivity over the broad operating range by the application of a selectively variable biasing magnetic field H through the ferrite substrate across its width dimension so as to be mutually orthogonal to the length dimension of the resonant cavity slots 10 and 12. By providing a magnetic bias, H, the electrical lengths of the resonant cavities 10 and 12 are effectively changed since the permeability of the ferrite material changes with the applied field.

Figure 2:
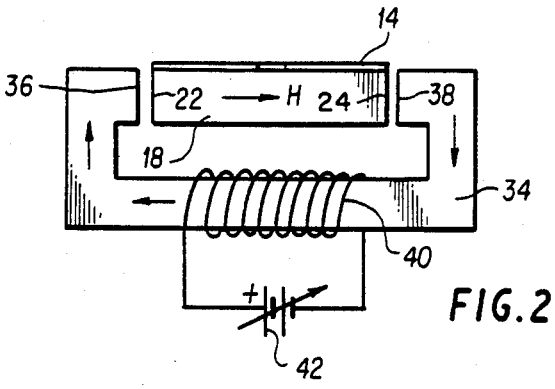
FIG. 2 is a schematic diagram illustrative of one known method of generating and applying a magnetic biasing field to the substrate shown in FIG. 1.

The biasing magnetic field H can be generated in any conventional manner; however, an illustrative means is shown in FIG. 2 which comprises an electromagnet comprised of an open core 34 having a pair of pole faces 36 and 38 placed adjacent the side faces 22 and 24 of the ferrite substrate 18. An electrical coil 40 is wound around the core 34 and a source of variable DC voltage 42 is connected thereto, thus providing a variable magnetic field H through the body of the ferrite substrate 18 as shown in FIG. 1. Thus by changing the effective electrical length of the resonant slots 10 and 12 shown in FIG. 1, a shift in the filter operating frequency is effected due to the fact that the slot length determines the resonant or center frequency of the bandpass filter.

Figure 3:
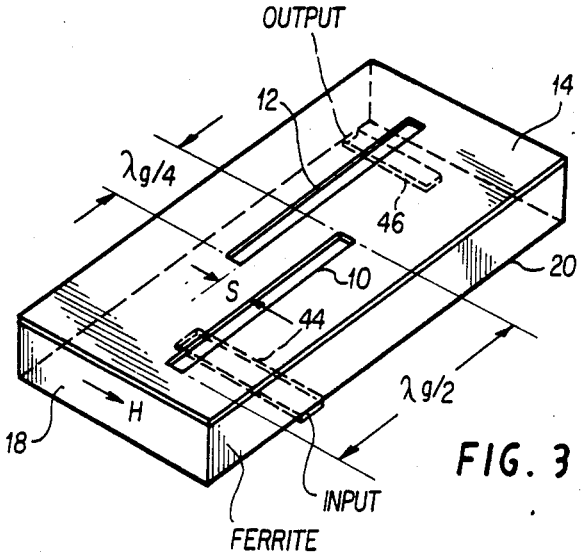
FIG. 3 is a perspective view of a second embodiment of the invention.

A second embodiment of the invention is shown in FIG. 3. This embodiment is illustrative of a quarter-wavelength, side-coupled configuration. There, as shown, the pair of slots 10 and 12 formed in the metallic film 14 comprise equal length half-wavelengt $\lambda_g/2$ cavities which are parallel and offset from each other by a separation S, but whose respective length dimensions mutually overlap by a quarter-wavelength $\lambda_g/4$. Input and output coupling in the embodiment shown in FIG. 3 is now provided, however, by a pair of open microstrip transmission lines 44 and 46 arranged orthogonally to the slots 10 and 12 on the opposite major face, i.e. bottom surface 20 of the ferrite substrate 18. As in FIG. 1, a biasing magnetic field H is applied through the body of the ferrite substrate 18 transversely across the resonant slots 10 and 12. When desirable, input and output coupling to the configuration shown in FIG. 3 can be provided by coaxial cable techniques shown in FIG. 1 and vice versa.

Both filter configurations, moreover, can be fabricated using a low cost, precision photolithographic process whereby the slot line circuit as well as the microstrip lines could employ this type of fabrication. Use of photolithographic fabrication, moreover, permits low cost monolithic devices having precision dimensions to within a tolerance of $\pm 0.0005$ inches.

Figure 4:
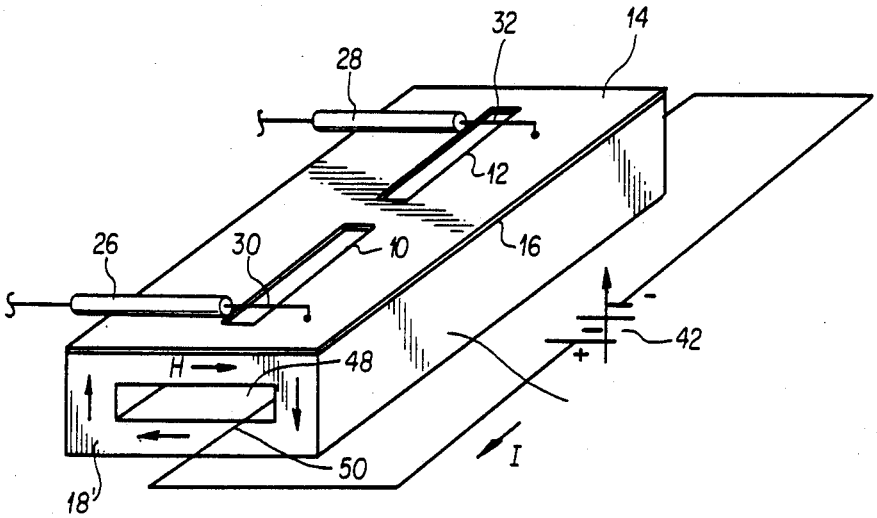
FIG. 4 is a perspective view generally illustrative of a third embodiment of the invention.
Figure 5:
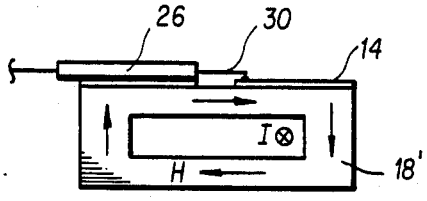
FIG. 5 comprises an end view of the embodiment shown in FIG. 4.

Another embodiment contemplated by the subject invention is shown in FIGS. 4 and 5 and is similar to the configuration shown in FIG. 1 with the exception that a toroidal ferrite substrate 18' is utilized. As in FIG. 1, a pair of end coupled resonant slots 10 and 12 are formed in the metallic film 14 fabricated on the top surface 16 and input and output coupling is achieved by way of a magnetic coupling loop formed using the center conductors 30 and 32 of a pair of coaxial cables 26 and 28. The toroidal ferrite substrate includes a central axial opening 48 conveniently shown having a rectangular cross section. The opening 48 permits the ferrite substrate 18' to be magnetized by a current carrying latching wire 50 which passes interiorly through the opening 48 along its entire length where it is connected, for example, across a variable DC source 42. With the current I flowing in the direction shown, the magnetic field H will have a polarity as shown in FIG. 5. This toroidal configuration allows the ferrite to be magnetized to a given state; that magnetization state is then retained without a holding current in the circuit. Such a filter as well as the others shown in FIGS. 1 and 3 are particularly adaptable to operate as a tunable pre-selector for communications or electronics receiver front-ends operating in the microwave/millimeter wave frequency bands.

It should also be noted that the "shorted" coaxial or "open" microstrip transmission line input and output means are not restricted to the specific embodiments shown in FIGS. 1 and 3, respectively, but each type can be applied to either the end-coupled or the quarter-wave coupled resonator configuration depending on the needs of the circuit designer.

Having thus shown and described what is at present considered to be the preferred embodiments of the invention, it should be noted that the same has been made by way of illustration and not limitation. Accordingly, all modifications, alterations and changes coming within the spirit and scope of the invention as defined in the appended claims are herein meant to be included.

We claim:

1. A tunable bandpass filter for microwave and millimeter wave frequencies, comprising:

a substrate of ferrite material and having at least one generally flat planar face;

a relatively thin layer of metallic material having a pair of intercoupled resonant slots therein located on said planar face, each of said slots having an elongated length and a relatively narrow width;

means for providing an input of microwave and millimeter wave signals to one of said pair of resonant slots;

means for providing an output of microwave and millimeter wave signals from the other of said pair of resonant slots; and means for generating and applying a biasing magnetic field of predetermined intensity through said substrate substantially orthogonal to the length of each of said pair of resonant slots and parallel to said planar face whereby the permeability of the ferrite material changes as a function of the intensity of the applied magnetic field to thereby change the effective length of said resonant slots and accordingly the resonant frequency of the filter.

2. The filter as defined by claim 1 wherein each of said slots has a length equal to one-half the wavelength of the electromagnetic wave energy in the filter.

3. The filter as defined by claim 2 wherein said pair of slots are mutually linearly aligned and having a predetermined separation to provide an end coupled slot configuration and where the separation between the slots determines the coupling strength between the coupled slots.

4. The filter as defined by claim 2 wherein said pair of slots are parallel and are mutually side-by-side for substantially one-half of their respective lengths to provide a quarter-wavelength side-coupled configuration, and being mutually separated by a predetermined distance which determines the coupling strength between the coupled slots.

5. The filter as defined by claim 2 wherein said substrate is of a generally rectangular cross section and including a pair of relatively large top and bottom major planar faces and a pair of relatively smaller side minor faces, wherein said layer of metallic material is located on said top major planar face and said biasing magnetic field is applied through said side faces.

6. The filter as defined in claim 5 and wherein said means for generating said biasing magnetic field includes means for varying the intensity of said magnetic field.

7. The bandpass filter as defined by claim 1 wherein said thin layer of metallic material comprises a film of copper formed on said planar face.

8. The filter as defined by claim 1 wherein said means for providing an input and an output of signal energy to and from said pair of resonant slots comprise a pair of coaxial transmission lines, each including a center conductor traversing said resonant slots and being connected to said layer of metallic material on one of the longer sides of said slots to form thereby magnetic coupling loops.

9. The filter as defined by claim 1 wherein said means for providing an input and an output of signal energy to and from said pair of resonant slots includes a pair of microstrip transmission lines aligned orthogonally relative to the lengths of said resonant slots on a second planar face of said substrate opposite said at least one planar face.

10. A tunable bandpass filter for microwave and millimeter wave frequencies comprising:

a continuous toroidal ferrite substrate having top and bottom exterior planar faces;

a layer of metallic material having a pair of intercoupled resonant slots therein located on one of said planar surfaces, each of said slots having an elongated length and relatively narrow width;

means for providing an input of microwave and millimeter wave signals to one of said pair of resonant slots;

means for providing an output of microwave and millimeter wave signals from the other of said pair of resonant slots; and means for generating a transverse magnetic flux in said one planar surface of said toroidal substrate normal to the length of each of said slots and parallel to said one planar surface.

11. The filter as defined by claim 10 wherein said means for generating includes an electrical conductor passing through said toroidal substrate.

* * * * *